March 15, 1932.  J. S. LITTLEFORD, JR  1,849,581
ROAD REPAIR APPARATUS
Filed Aug. 25, 1928   3 Sheets-Sheet 1

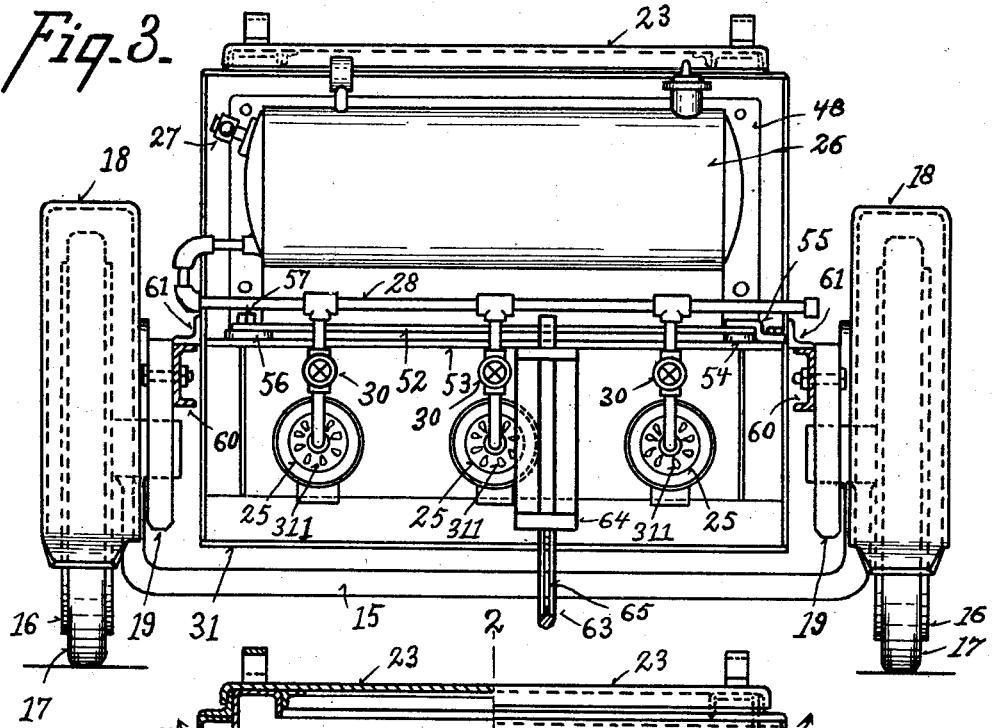

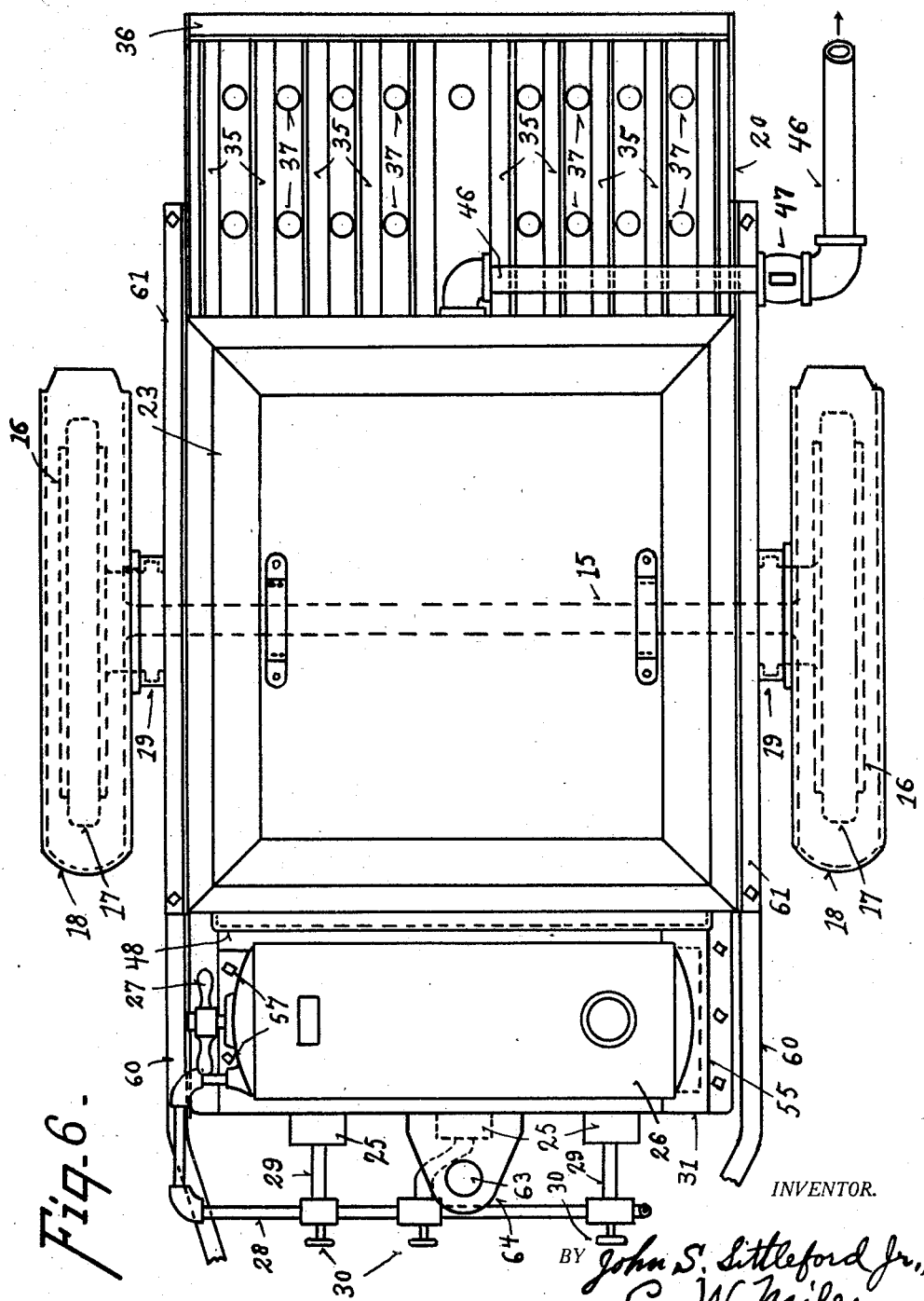

Patented Mar. 15, 1932

1,849,581

UNITED STATES PATENT OFFICE

JOHN S. LITTLEFORD, JR., OF FORT THOMAS, KENTUCKY

ROAD REPAIR APPARATUS

Application filed August 25, 1928. Serial No. 302,047.

My invention relates to improvements in road repair apparatus. One of its objects is to provide an improved road repair vehicle preferably of the trailer type having a container in which a body of asphaltum sufficient for the repair of roads is adapted to be heated and maintained in fluid condition, a combustion chamber to heat said asphaltum container and in which road repair tools are adapted to be heated. Another object is to provide an improved road repair vehicle in which the asphaltum may be heated, the tools heated and in which the heating is effected by means of liquid fuel torches, adjustable to secure temperatures over a relatively wide range. Another object is to provide an improved arrangement of asphaltum container tool heater and fuel storage adapted to be employed as a trailer vehicle, and also as a stable stationary outfit when detached from its driving member. Another object is to provide an improved combustion chamber adapted to serve as a tool heater and as an asphaltum heater. Another object is to provide a vehicle for the above purposes in which rubber tired wheels may be employed and protected from heat injury. Another object is to protect the body of the vehicle and combustion chamber from injury or distortion due to the high temperatures in the combustion chamber. Another object is to provide for the carrying of a fuel supply and protecting the same from high temperatures and balancing the weight of fuel, etc., upon the vehicle.

My invention also comprises certain details of form and arrangement and combination of components, all of which will be fully set forth in the description of the accompanying drawings in which:

Fig. 3 is a front end elevation.

Fig. 4 is a rear end elevation partly in vertical section on line 4—4 of Fig. 2.

Fig. 5 is a sectional detail of the vehicle supporting leg.

Fig. 6 is a plan view of the apparatus shown in Fig. 1.

Figure 1:
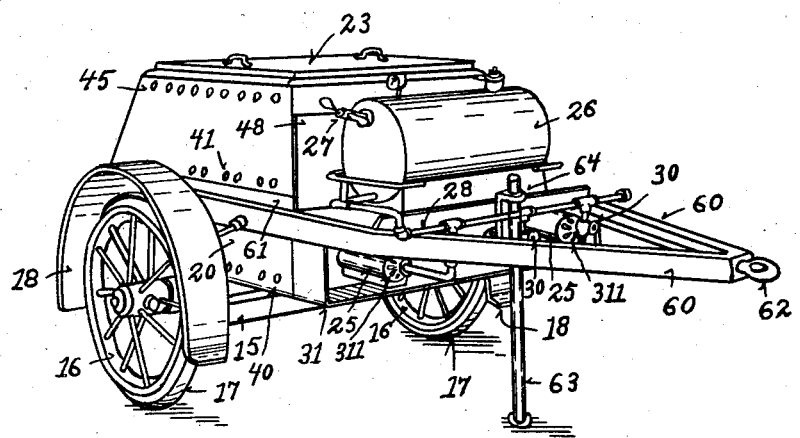
Fig. 1 is a perspective view of a road repair vehicle embodying my improvements.
Figure 2:
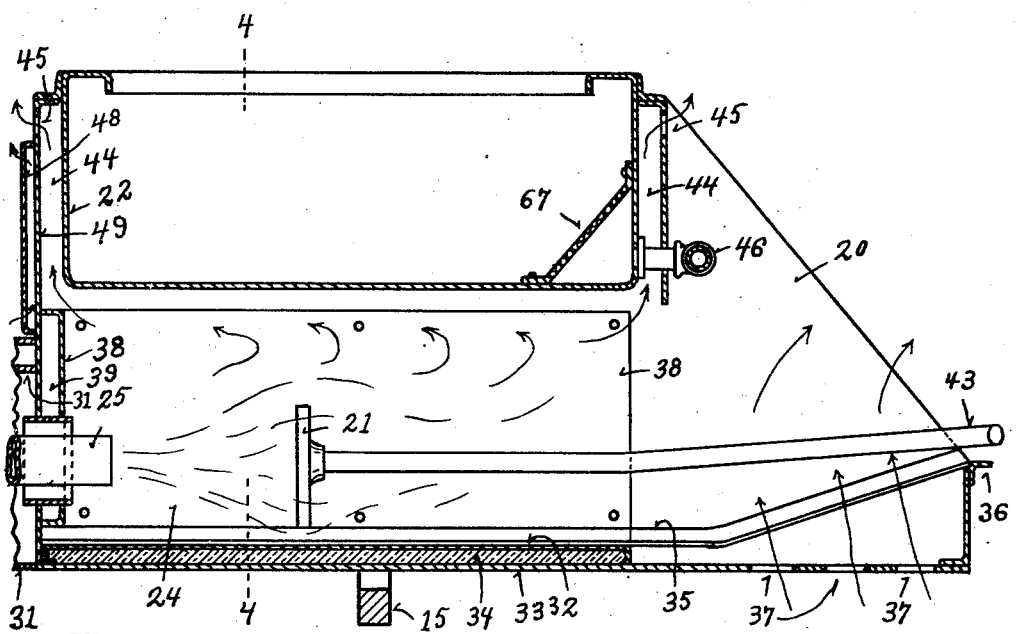
Fig. 2 is a central vertical section through the same taken on line 2—2 of Fig. 4.

The accompanying drawings illustrate one embodiment of my invention in which 15 represents a vehicle axle provided with a pair of vehicle wheels 16, which are preferably provided with rubber tires 17, and with fenders 18 which are mounted relative to the body of the vehicle with interposed air spaces providing for air circulation between the vehicle body and the fenders, and for circulation of air between the fender and the rubber tires, whereby the rubber tires are protected from excessive or injurious temperatures. By the use of rubber tires the vehicle is enabled to travel smoothly along the roads at relatively high rates of speed and hence to quickly cover relatively wide ranges of territory, and to keep pace with rubber tired trucks to which it may be attached without liability of injury thereto. The axle 15 is provided with journals for the hubs of the wheels 16. The axle is movable vertically in guide ways 19, attached to the sides of the vehicle, and supporting or tensioning springs are interposed in said guide ways 19 between the axle and vehicle to cause the vehicle to ride smoothly over the roads.

The vehicle body 20 comprises a sheet metal shell enclosed upon the front and sides and partly open at the rear, and is open at the top to receive a detachably mounted tar kettle 22 and a detachable lid 23 for the tar kettle. Beneath the tar kettle is a combustion chamber 24 which is heated by means of one or more blow torches 25 fed with liquid fuel, such as coal-oil or gasoline for instance, which liquid fuel is stored in a sheet metal reservoir or container 26 mounted upon the front of the vehicle above the torches 25. An air pump 27 provides for pumping air into the container 26 to create a pneumatic pressure upon the liquid fuel in the container 26 sufficient to force the liquid fuel into the torches 25 as a fine spray which provides its own supply of forced air draft for complete combustion of the fuel. A fuel supply pipe 28 with branches 29 leading to the respective torches are controlled by separate fuel regulating valves 30. One or more of these blow-torches may be operated at one time, and each independently valve controlled to provide any amount of heat in the combustion chamber which may be required. The blow-torches are provided with independently adjustable air supply dampers 31. The blow-torches are protected by means of a hood or sheet metal forward extension 31 against excessive side or other air drafts tending to blow out the torches or interfere with their operation.

The bottom of the combustion chamber is composed of two separate metal walls 32 and 33 which are separated one from the other and the intervening space is filled with a heat insulating and high temperature resisting material 34 adapted to prevent any material conduction of heat or cold in either direction through the bottom wall of the combustion chamber. Above the bottom wall of the combustion chamber are mounted a series of angle bars 35 longitudinally of the vehicle. Within the combustion chamber the bars 35 serve to support a series of hand operated road repair tools 21 above and chiefly out of contact with the bottom of the combustion chamber, in position to be heated from said torches. Said bars 35 also serve as guideways along which the tools may be guided into and out of the combustion chamber. The rear end of the combustion chamber below the level of the bottom of the tar kettle is open for the introduction and removal of the tools. While the heads of the tools are being heated in the combustion chamber, the handles 43 of the tools extend out through the open rear end of the combustion chamber and rest upon the rear ends of the bars 35 or upon a cross bar 36 at the rear of the vehicle. The bottom of the vehicle in rear of the combustion chamber is perforated at 37 to provide for the passage upwardly of a moderate or limited current of cool air through the perforations 37 and upwardly across the handles of the tools to keep the tool handles sufficiently cool to be handled conveniently.

The side walls and front end wall of the combustion chamber are provided with detachable liner plates 38 forming intervening air spaces 39, which air spaces are provided with inlet air ports 40 and exit air ports 41, whereby a limited air circulation through said air spaces is provided, and both the inner and outer walls of spaces 39 are protected against excessive temperatures, and the combustion chamber is protected against excessive heat losses through the side walls. Also the side walls are strengthened and protected from buckling and distortion. The liner plates 38 may also be removed and replaced if injured or burned out.

The products of combination from the combustion chamber are led upwardly through off-take flues 44 along the sides of the tar kettle and escape into the atmosphere through perforations 45. The heated tar is withdrawn as required from the kettle through a pipe 46, controlled by a valve 47. In order to prevent the fuel contained in the fuel reservoir 26 from becoming excessively heated, particularly in hot weather due to its necessary proximity to the torches and to the heated tar kettle and off-take flues 44, I provide a plate 48, attached to the outer wall 49, of the flue 44 adjacent to the fuel reservoir and interposed between the fuel reservoir and the wall 49. An air space is provided between the plates 48 and 49, and perforations 50 and 51 provide for a limited circulation of air to and from the space between said plates 48 and 49, and also a free circulation of air between the outer face of plate 48 and the exterior of the fuel reservoir to practically prevent heating the fuel from the flue 44 or plate 49. The fuel reservoir is also detachably mounted upon a plate 52, which is supported above and out of contact with the plate 53 which forms the upper face of the draft hood 31 surrounding the blow torches. At one end plate 52 rests upon a cross bar 54 and beneath the ends of a pair of fingers 55, and at the opposite end of the plate 52 said plate is supported upon a cross bar 56 to which the plate is detachably bolted by means of bolts 57. The fuel reservoir is thus supported detachably in place by means of the plate 52 and cross bars 54 and 56, with a free circulation of air beneath the plate 52 and between the plates 52 and 53, and also a free circulation of air above the plate 52 and between the plate 52 and the fuel reservoir to prevent transfer of heat from the plate 53 to the fuel reservoir.

The vehicle is preferably provided with a single axle 15 and one pair of wheels 16, and is provided with a forked draw-bar 60 which is attached to the body of the vehicle by means of angle plates 61 attached to opposite sides of the vehicle body, and to which the draw-bar 60 is attached. The vehicle is preferably employed as a trailer. An eye 62 is attached to the draw-bar by means of which the draw-bar may be attached to the rear end of a truck or tractor to enable the vehicle to be drawn from place to place. When detached from the tractor the vehicle is maintained in a substantially horizontal or operative position by means of a foot 63 the lower end of which rests upon the ground and supports the vehicle while the upper end of the foot 63 is latched to a U-shaped plate 64 through perforations in the free end of which plate the upper end of the foot extends and is vertically adjustable. The latch member 65 is attached to the foot 63 and in the full line position as shown in Fig. 5 supports the truck upon the foot 63, while in the dotted line position the foot is held elevated and out of contact with the ground. A screen 67 is preferably employed to screen any solid substance from the tar before it flows to the pipe 46. The weight of the vehicle, tar kettle tar and fuel in the fuel reservoir are so proportioned and arranged as to substantially balance all of the weight upon the axle and wheels, leaving only a minor portion of the weight to be supported by the foot 63.

The apparatus herein shown and described is capable of considerable modification within the scope of the claim without departing from the spirit of my invention.

What I claim is:—

A road repair vehicle comprising a combustion chamber open at one end and provided with a hearth extending outwardly from and beneath the opening to said combustion chamber, said combustion chamber to receive and heat the heads of road repair tools while the handles of said tools are supported above said hearth and remain comparatively cool, and a tar kettle mounted above and adapted to be heated by the products of combustion from said combustion chamber.

In testimony whereof I have affixed my signature.

JOHN S. LITTLEFORD, JR.